United States Patent [19]

Krings

[11] Patent Number: 4,819,232
[45] Date of Patent: Apr. 4, 1989

[54] FAULT-TOLERANT MULTIPROCESSOR ARRANGEMENT

[75] Inventor: Lothar Krings, Baden, Switzerland

[73] Assignee: BBC Brown, Boveri & Company, Limited, Baden, Switzerland

[21] Appl. No.: 941,991

[22] Filed: Dec. 15, 1986

[30] Foreign Application Priority Data

Dec. 17, 1985 [CH] Switzerland ............... 5376/85

[51] Int. Cl.⁴ .................................. G06F 11/20
[52] U.S. Cl. .......................... 371/9; 371/12; 364/200
[58] Field of Search .............. 371/9, 12; 364/200, 364/900

[56] References Cited

U.S. PATENT DOCUMENTS

| | | | |
|---|---|---|---|
| 4,030,074 | 6/1977 | Giorcelli | 364/200 |
| 4,443,849 | 4/1984 | Ohwada | 364/200 |
| 4,700,292 | 10/1987 | Campanini | 364/200 |
| 4,710,926 | 12/1987 | Brown et al. | 371/9 |

OTHER PUBLICATIONS

Wexler, Checkpoint Updating, IBM Technical Disclosure Bulletin, vol. 13, No. 6, Nov. 1970, pp. 1585-1586.
Dieterich et al., A Compatible Airborne Multiprocessor, Proc. of Fall Joint Computer Conf., 18-20, Nov. 1969, Las Vegas, AFIPS Montvale (U.S.A.), pp. 347-357.

Primary Examiner—Charles E. Atkinson
Attorney, Agent, or Firm—Oblon, Fisher, Spivak, McClelland & Maier

[57] ABSTRACT

When a fault is detected in a processor, program execution in this processor is interrupted and taken up again by a standby processor from an earlier uncorrupted state, a recovery point. Such recovery points are specially provided in the program. A save copy of the state at the recovery points is created in each case in a state save unit by recording changes compared with the respective previous state. The data memory existing in the state save unit has pairs of memory words, in which arrangement the state at the recovery point last reached is in each case saved in one of the memory words and the current changes are in each case recorded in the respective other memory word. The memory words are accessed via pointers which are formed by a control logic from two check bits allocated to each memory word pair. Processing of the check bits and of the pointers is very fast. It is not necessary to copy data within the state save unit. The standby processor has direct access to the saved data.

6 Claims, 4 Drawing Sheets

FAULT-TOLERANT MULTIPROCESSOR ARRANGEMENT

BACKGROUND OF THE INVENTION

1. Field of the Invention

This invention relates generally to a fault-tolerant multiprocessor arrangement and more particularly to a fault-tolerant multiprocessor with a memory for storing the previous data state.

2. Discussion of Background

Transient or permanent hardware and software faults in a fault-tolerant multiprocessor arrangement must be detected and eliminated as quickly as possible. For the purpose of fault detection, two processors forming one data processor are frequently operated in parallel with the same program and their results are monitored for correspondence. As soon as a fault occurs, program execution is interrupted (fail-stop function). To ensure that the program is executed even after a fault, particularly in the case of process computer applications, a back-up task is activated on a hot-standby processor which is provided with the same I/O channels.

Since it is a very complex task to guarantee the integrity of each individual (atomistic) operation during the activation of the standby processor and since more time is frequently required for fault detection than for the execution of an individual operation, execution of the program is usually resumed by the standby processor at one of several earlier points specially provided for in the program (recovery point). This point has been reached without faults by the processor originally executing the program (rollback technique). By resuming at this point, some of the operations will be repeated.

Execution of the program is preferably resumed at the recovery point last reached without faults. However, this is only possible if the time of occurrence of the fault and the time of its detection lie within the same interval between the same recovery points, for example recovery points $RP_i$ and $RP_{i+1}$. Otherwise, execution of the program must be resumed at the recovery point $RP_{i-1}$ or an even earlier recovery point (multiple-step rollback technique).

To resume program execution at a recovery point, the standby processor needs, in addition to the program, a copy of the data state which existed at this recovery point in the main memory of the processor originally executing the program. The program, which does not change with time can be made available to the standby processor at program start up. In contrast, copies must be provided of the continuously changing data state at each recovery must be stored in a manner accessible to the standby processor at program start up the respectively next recovery point is reached.

The speed with which program execution is resumed by the standby processor after an error and with which the state of program execution already achieved when the error occurred is achieved again obviously depends on the mechanism of creation of these copies, the mechanism by which these copies are accessed by the standby processor and the amount of code between the individual recovery points in the program.

The data state copies are created in a so-called state save unit (SSU). This unit is arranged to be electrically isolated and spatially separated from the processor executing the program so that it will not also be affected by an error in this processor. As has already been mentioned, the standby processor should be able to rapidly access the data state save copies which is why the state save unit is usually arranged close to the standby processor.

The simplest way of creating the data state copies at the recovery points consists of the processor executing the program transferring the total contents of the memory allocated to it into the state save unit after each recovery point has been reached. However, program execution must be interrupted during the time required for this operation.

To save time, the amount of data to be transferred into the state save unit can be reduced by transferring only the changes $D_{i,\,i+1}$, produced by the write accesses in the interval which has just elapsed, for example between recovery points $RP_i$ and $RP_{i+1}$, to the state save unit. This is possible because the data state $S_{i+1}$ at the recovery point $RP_{i+1}$ differs from the preceding data state $S_i$ at recovery point $RP_i$ only by the changes $D_{i,\,i+1}$:

$$S_{i+1} = S_i + D_{i,\,i+1}.$$

If an error occurs during the process of transferring, the data or changes $D_{i,\,i+1}$ into the state save unit using this procedure, the problem is created that the no longer current "old" data state $S_i$ is already partially overwritten by the data or changes of the more current "new" data state $S_{i+1}$ but the "new" data state $Si+1$ has not yet been completely recorded. There is then no valid data state available in the state save unit.

One possibility of avoiding this problem consists in duplicating the state save unit. Such a duplication is already known from Ferridun, A. M.; Shien, K. G., A fault tolerant multiprocessor with rollback recovery capability, Proc. 2nd Intern. Conf. on Distr. Comp. Systems, pages 283–289, 4/81.

While one half of the duplicated state save unit is in each case available for receiving the new data state, for example $S_{i+1}$, the "old" data state Si is stored in the other half. The function of the two halves of the duplicated state save unit (updating, storing) alternates at each recovery point.

Since the saved data state, for example $S_i$, in one half of the duplicated state save unit is not influenced by filing the new data state $S_{i+1}$ in its other half, filing of the new data state $S_{i+1}$ can take place during program execution in the interval between recovery points $RP_i$ and $RP_{i+1}$ so that, as a rule, no further interruption of program execution is required.

To file the data state $S_{i+1}$, it is possible to copy the data state $S_i$ in the state save unit into its respective other half in order to be updated and at the same time to record the current changes $D_{i,\,i+1}$ in this half. On the other hand, it is also possible to transfer, instead of the entire data state $S_i$, only the changes $D_{i-1,\,i}$ carried out in the preceding interval between recovery points $RP_{i-1}$ and $RP_i$ in the half containing data state $S_i$ in the current interval into the half to be updated in the state save unit because it holds true that:

$$S_{i+1} = S_{i-1} + D_{i-1,\,i} + D_{i,\,i+1}.$$

For this purpose, however, the state save unit memory words or addresses which have been modified in the preceding interval must be flagged. This can be done by allocating a separate bit to each memory word of the state save unit. Another bit can be used in a known manner for identifying the memory words of the state save unit half to be updated in which current changes $D_{i, i+1}$ have already been made in the interval current in each case. This allows the transfer of changes $D_{i-1, i}$ in the state save unit and the recording of current changes $D_{i, i+1}$ to be nested together since overwriting of the current changes $D_{i, i+1}$ with changes $D_{i, i-1}$ from the preceding interval can be avoided by checking the other bit. The two bits mentioned change meaning at every recovery point.

The method described can be used for creating the save copies in the state save unit without any effect on the running of the program if the transfer of all changes $D_{i-1, i}$ from the preceding interval in the state save unit can be concluded before the next recovery point in each case is reached in program execution. However, this means that the minimum distance between two recovery points is determined by the transfer time.

However, the recovery points cannot easily be provided at arbitrary points in the program and at arbitrary distances from one another. Problems which would arise, for example, during resumption of program execution by the standby processor due to the repetition of output operations to the peripherals or the repetition of inter-process communication can be avoided only by providing recovery points in each case immediately following such operations.

However, this requirement establishes an upper limit for the mutual distance between recovery points. The mutual distance between recovery points is therefore primarily determined by the intensity of the I/O operations required. In particular applications, it an be shorter than the time require for data transfer in the state save unit.

SUMMARY OF THE INVENTION

The primary object of this invention is therefore to reduce the time requirements within the state save unit.

According to this invention, data do not need to be transferred within the state save unit which is essentially formed by the second data memory and its associated control logic. Instead, pointer bits are used which specify where the data belonging to the "old" and "new " state are stored in the state save unit. Modification of the pointer bits, which is all that is required, is mush more efficient than the known data transfer within the state save unit and, in addition, is independent of the memory word width. The pointer bits are formed from check bits which can be stored in a separate high speed memory. Only the simplest logic operations are required for forming the pointer bits and for modifying them. The bit operations can be carried out completely successively, partially parallel or completely in parallel. Partial or complete parallel execution of the bit operations advantageously entails further time saving. The high speed memory preferably used for the check bits and the logic required for the bit operations can be integrated in a single VLSI chip. This additionally increases the processing speed of the bits. In addition, this solution leads to a simple and elegant circuit configuration. The data link is preferably an optical data channel. This optimally results in electric isolation between the state save unit and the first processor executing the program and the first data memory allocated to it as main memory. As a result, an error in the first processor or in the first data memory cannot influence the data saved in the state save unit. By using a buffer memory on the transmit side of the data link, the data (and addresses) to be transferred via the data link can be transferred with relatively uniform distribution in time. As a result, the band width required for the data link can be advantageously reduced.

So that the saved data state of the second processor used as standby processor is available as directly as possible after fault of the first processor, the control logic can be designed in such a manner that it allows the second processor to have direct access to the second data memory. In this case, the second data memory is used directly as main memory by the second processor.

The overall multiprocessor arrangement can be of symmetrical configuration so that the processors save one another's data. Three or even more processors can also be connected together to a network saving one another's data.

BRIEF DESCRIPTION OF THE DRAWINGS

Further developments and advantages of the invention can be seen in the subsequent explanation of illustrative embodiments, reference being made to the accompanying drawings in which.

DETAILED DESCRIPTION OF THE PREFERRED EMBODIMENTS

Figure 1:
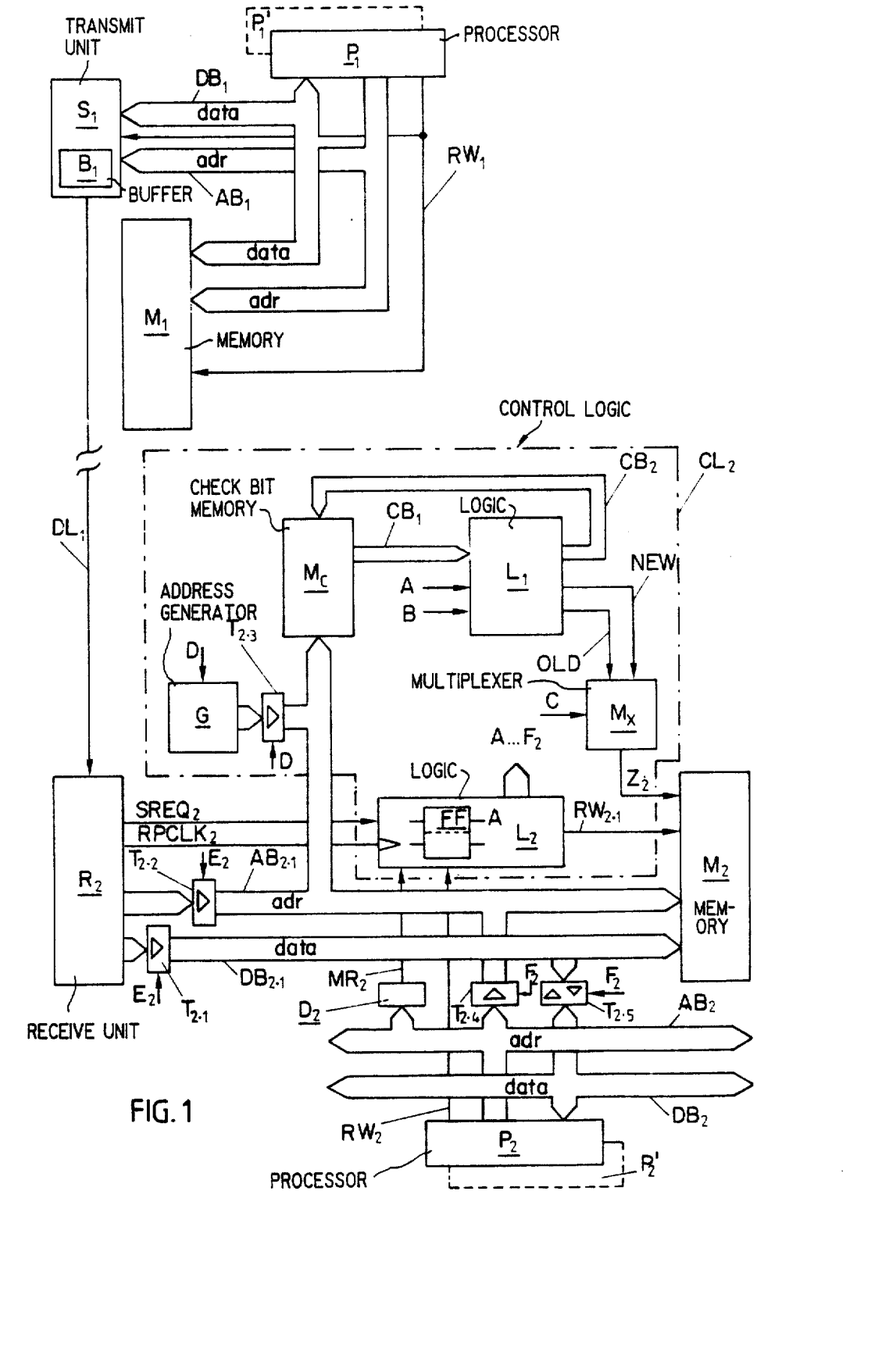
FIG. 1 is a block diagram showing the fault-tolerant multiprocessor arrangement according to the invention, comprising a first embodiment of the control logic in which the bit operations are executed successively.

A more complete appreciation of the invention and many of the attendant advantages thereof will be readily obtained as the same becomes better understood by reference to the following detailed description when considered in connection with the accompanying drawings, wherein $P_1$ designates a first processor in FIG. 1. This processor is connected via a data bus $DB_1$ and an address bus $AB_1$ to a first data memory $M_1$. A control line $RW_1$ is used for controlling the read/write memory operations. The data bus $DB_1$ and the address bus $AB_1$ are connected to a transmit unit $S_1$. During all write operations of the processor $P_1$ to the first data memory $M_1$, this unit transmits the addresses adr and data appearing on the multi-core buses $DB_1$ and $AB_1$ over a data link $DL_1$, if necessary after temporary storage in a buffer memory $B_1$. The write operations are recognized by the transmit unit $S_1$ by the logic state on control line $RW_1$ which is also supplied to it. In addition to processor $P_1$ another processor $P_1$, can be provided which, together with the processor $P_1$, forms a data processor which is designated as first processor in the following. The two processors $P_1$, $P_1$ of this data processor are capable of checking each other and of generating a fault message and stopping operation when a fault occurs (fail-stop function).

The data and addresses adr transferred by the data link $DL_1$ are received in a receive unit $R_2$ and, if necessary, are output again to a data bus $DB_{2.1}$ and an address bus $AB_{2.1}$ after temporary storage. The buses $DB_{2.1}$ and $AB_{2.1}$ are connected to a second data memory $M_2$. Among other purposes, this memory is used as a save memory for the data written by the first processor into the first data memory $M_1$ and transferred to it via the data link $DL_1$. Other tasks of the second data memory $M_2$ are explained below. To exercise its save function, the second data memory $M_2$ has a pair of memory words at the corresponding address adr in each case at least for each memory word of the first data memory $M_1$ receiving write inputs from the first processor during program execution. One of the two memory words of each pair is in each case used for storing the contents of the memory word, corresponding to the respective pair with respect to address, in the first data memory $M_1$ at the last recovery point. The other memory word of each pair is used for storing the current contents, possibly changed after the last recovery point, of this memory word.

The addresses adr on address bus $AB_{2.1}$ only address pairs of memory words in the second data memory $M_2$ and not individual memory words. Addresses adr are therefore incomplete for the second data memory $M_2$. To complete them and to form the memory word address of the second data memory $M_2$, an additional address bit $Z_2$ is needed which is supplied by a control logic $CL_2$.

The control logic $CL_2$ contains a control bit memory $M_C$ the address inputs of which are connected to the address bus $AB_{2.1}$. The word width of the check bit memory $M_C$ is three bits. The corresponding three data outputs of the check bit memory $M_C$ are connected to a check bit bus $CB_1$ which leads to first logic $L_1$. The input of the first logic $L_1$ is also connected to two control lines A and B whose meaning will be explained below. At the output, the first logic $L_1$ is connected to another check bus $CB_2$ which leads back to the check bit memory $M_C$, to two signal lines OLD and NEW. The latter lead to a multiplexor $M_X$ which, depending on the logic state of a control line C, switches one of them through to its output. This output supplies the previously mentioned additional address bit $Z_2$ for the second data memory $M_2$.

The control logic $CL_2$ also contains second logic $L_2$. This is connected to two signal lines $SREQ_2$ and $RPCLK_2$ which are connected to outputs of the receive unit $R_2$. At the output, the second logic $L_2$ is connected to the previously mentioned control lines A, B and C and to further control lines D, $E_2$, $F_2$ and $RW_{2.1}$.

The signal on control line D is applied to a tristate driver $T_{2.3}$ by way of which an address generator G is connected to the address bus $AB_{2.1}$. The control lines $E_2$, $F_2$ and $RW_{2.1}$ emerge from the control logic $CL_2$. Control line $RW_{2.1}$ is used for controlling the read/write memory operations in the second data memory $M_2$ and is therefore connected to this memory. The signal on control line $E_2$ is applied to tristate drivers $T_{2.1}$ and $T_{2.2}$ in buses $AB_{2.1}$ and $DB_{2.1}$.

The fault-tolerant multiprocessor arrangement of FIG. 1 is completed by a second processor which, like the first processor, is provided with two processors $P_2$ and $P_2'$, which check each other, and by address and data buses $AB_2$ and $DB_2$ associated with these processors. The latter buses are connected via tristate drivers $T_{2.4}$ and $T_{2.5}$ to buses $AB_{2.1}$ and $DB_{2.1}$. The tristate driver $T_{2.5}$ is designed to be bidirectional. The signal on control line $F_2$ is applied to tristate drivers $T_{2.4}$ and $T_{2.5}$. The address bus $AB_2$ is connected to a decoder $D_2$ which generates from the addresses adr appearing on this bus a memory request signal $MR_2$ which is supplied to an input of the second logic $L_2$ in the control logic $CL_2$. Finally, the signal of another control line $RW_2$ which is directly connected to the second processor consisting of processor $P_2$ and $P_2'$ and which is a read/write control line is also applied to the second logic $L_2$.

The fault-tolerant multiprocessor arrangement, the configuration of which is described above, operates in the following manner. The first processor processes a program, which program is provided with recovery points. At each of these recovery points, the data state of the first data memory $M_1$ should be stored as save copy in the second data memory $M_2$ so that, in a case of a failure of the first processor, the second processor can take over and continue execution of the program at the last recovery point reached without faults by the first processor. In addition to the data state, the second processor naturally also needs the program itself for this purpose. However, this should be available to it right from the start.

The text which follows first explains how the save copies are created in the second data memory $M_2$. Following this, the manner in which the second processor accesses the save copies in the event of a failure of the first processor is explained.

To create the save copies, all data written by the first processor into the first data memory $M_1$ and the means by which its data state is changed are acquired by the transmit unit $S_1$ and are transmitted, together with their addresses adr, via the data link $DL_1$ to the receive unit $R_2$. From this unit, the second data memory $M_2$ receives the data via the data bus $DB_{2.1}$ and the addresses adr via the address bus $AB_{2.1}$. As already stated, the transferred addresses adr are incomplete for the second data memory $M_2$ since they are in each case two memory words in the second data memory $M_2$ which have the address adr. To complete the addresses adr, the control logic $CL_2$ in each case generates the additional bit $Z_2$. During generation of this bit, the control logic must ensure that no data belonging to the "old" state, that is to say to the state at the recovery point last reached without faults by the first processor, are overwritten in the second data memory $M_2$. For this purpose, the control logic $CL_2$ must know in which of the two memory words of the pairs having the common address adr the data item belonging to the "old" state is stored. In addition, the control logic must remember in each case in which of the memory words under its control a data item belonging to the "new" state, that is to say a data item written into the first data memory by the first processor after the recovery point last reached without faults, has been stored.

Two check bits BIT1(adr) and BIT2(adr) are provided for each address adr in the check bit memory $M_C$ for storing this information. In addition to the check bits BIT1(adr) and BIT2(adr), the check bit memory $M_C$ contains for each address adr another check bit BIT3(adr) the meaning of which will still be explained.

At the same time that the memory word pairs are addressed in the second main memory $M_2$, the respective associated check bits, forming a triplet, in the check bit memory $M_C$ are addressed since this is also connected to the address bus $AB_{2.1}$. The check bits BIT1(adr), BIT2(adr) and BIT3(adr) addressed in each case appear at the three data outputs of the check bit memory $M_C$ and reach the first logic $L_1$ via the check bit bus $CB_1$. In this logic, a pointer bit OLD(adr) is formed from the check bits BIT1(adr) and BIT2(adr) and from a check bit A by means of simple logic gates in accordance with the rule $$OLD(adr) := A + BIT1(adr).\overline{A} + BIT2(adr) . A$$

In addition, a pointer bit NEW (adr) is formed in accordance with the rule $$NEW(adr) := \overline{OLD(adr)}$$

that is to say be inverting the pointer bit OLD(adr). Above, as in the text which follows, the dot means a logical AND operation, the plug sign means a logical OR operation and the bar above the symbols means negation.

As can be easily reconstructed with the aid of the rule for forming the OLD(adr) pointer bit and by means of the first truth table below, the OLD(adr) pointer bit alternately corresponds to the BIT1(adr) check bit or to the BIT2(adr) check bit, depending on the binary state of control bit A.

| | First truth table | | |
|---|---|---|---|
| A | BIT1(adr) | BIT2(adr) | OLD(adr) |
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |

Control bit A is generated by the second logic $L_2$ and passes to the first logic $L_1$ via control line A of the same name. It changes its binary state at each recovery point. It is preferably derived from the initial state of a flip flop FF contained in the second logic $L_2$. That a recovery point has been reached can be indicated, for example, by means of a message transferred via data bus $DB_1$ to transmit unit $S_1$ by the first processor Following this message, transmit unit $S_1$ in each case transmits a corresponding message to receive unit $R_2$. When it receives this message, this unit generates a recovery point clock signal which passes via signal line $RPCLK_2$ to the second logic $L_2$ which subsequently inverts the binary state of control bit A and of the flip flop FF.

The OLD(adr) and NEW(adr) pointer bits are output by the first logic $L_1$ on control lines OLD and NEW and pass via these lines to multiplexor $M_X$. They are used alternately, depending on the logic state of control line C at multiplexor $M_X$, as additional address bit $Z_2$ for the second data memory $M_2$. The OLD(adr) pointer bit addresses in each case the memory word of the pairs in the second data memory $M_2$ which contains the data item belonging to the "old" state while the NEW(adr) pointer bit in each case addresses the memory word into which the new data item (present on data bus $DB_{2.1}$) is to be written (or has been written). In the process of writing the saving data which were transferred via data link $DL_1$ into the second data memory $M_2$ the NEW(adr) pointer bit must naturally be selected by the multiplexor $M_X$. The OLD(adr) pointer bit is in each case used for the read access, to be discussed below, to the "old" data state by the second processor. The fact that the NEW(adr) pointer bit is in each case formed with the inverse binary state from the OLD(adr) pointer bit in the first logic $L_1$ ensures in a simple manner that data belonging to the "old" data state are not overwritten in the second data memory $M_2$.

The binary state of the control line C determining the selection of the two pointer bits OLD(adr) and NEW(adr) is checked by the second logic $L_2$. Every time data and addresses are ready in the receive unit $R_2$, this logic receives a save request signal on signal line $SREQ_2$ from the latter. Subsequent to this signal, the binary state of control line C is set by the second logic $L_2$ in such a manner that the NEW(adr) pointer bit is switched through at the multiplexor $M_X$. The second logic $L_2$ informs the second data memory $M_2$ via the read/write control line $RW_{2.1}$ that the data present on data bus $DB_{2.1}$ are to be stored.

As has already been mentioned, the control logic $CL_2$ must remember the write destination for the new data. For this purpose, check bits BIT1(adr) and BIT2(adr) are newly determined from the pointer bit OLD(adr) and NEW(adr) and the control bit A in the logic $L_1$ in accordance with the rules $$BIT1(adr) := NEW(adr) . A + OLD(adr) . \overline{A} \text{ and}$$

$$BIT2(adr) := NEW(adr) . \overline{A} + OLD(adr) . A$$

and written via check bit bus $CB_2$ into check bit memory $M_C$, overwriting the original values of these check bits. As can again be reconstructed by means of the specified rules of formation for the BIT1(adr) and BIT2(adr) check bits and by means of the second truth table below, however, only the check bit which does not happen to correspond to the pointer bit OLD(adr), in dependence on the logic state of check bit A, is effectively newly determined. The check bit corresponding to pointer bit OLD(adr) remains unchanged in order to retain the information of which of the pairs of memory words of the second data memory $M_2$ the data item belonging to the "old" state is stored.

| | Second truth table | | | | | |
|---|---|---|---|---|---|---|
| A | BIT1(adr) (old) | BIT2(adr) (old) | OLD (adr) | NEW (adr) | BIT1 (adr) (new) | BIT2 (adr) (new) |
| 0 | 0 | 0 | 0 | 1 | 0 | 1 |
| 0 | 0 | 1 | 0 | 1 | 0 | 1 |
| 0 | 1 | 0 | 1 | 0 | 1 | 0 |
| 0 | 1 | 1 | 1 | 0 | 1 | 0 |
| 1 | 0 | 0 | 0 | 1 | 1 | 0 |
| 1 | 0 | 1 | 1 | 0 | 0 | 1 |
| 1 | 1 | 0 | 0 | 1 | 1 | 0 |
| 1 | 1 | 1 | 1 | 0 | 0 | 1 |

The recovery points, the arrival the control logic $CL_2$ and the second logic $L_2$ contained in it by the recovery point clock signal on signal line $RPCLK_2$ represent points in time which are of importance to the storage process described. At these points, all data previously belonging to the "new" state become data belonging to the "old" state in the second data memory $M_2$ since the old state refers in each case to the recovery point last reached. By inverting control bit A at each recovery point, however, this is taken into account in a simple manner. This is because, after inversion of the control bit A, the OLD(adr) pointer bit is derived from the other check bit BIT1(adr) or BIT2(adr) as before in each case by the first logic $L_1$. If, for example, the OLD(adr) pointer bit was derived from the BIT1(adr) check bit in the interval elapsed between the previously reached recovery point $RP_{i-1}$ and the current recovery point $RP_i$, it is now, in the current interval, derived from the BIT2(adr) check bit until the next recovery point $RP_{i+1}$ is reached. But this check bit contains just the information into which of the memory words of the memory word pairs of the second data memory $M_2$ the data item was written as belonging to the "new" but now to the "old" state in the interval just elapsed. The data belonging to the "old" data state are thus directly available after the inversion of the control bit A which can be executed very rapidly by simply switching over the flip flop FF in the logic $L_2$.

However, the above discussion left out of consideration the fact that, as a rule, the write accesses take place only to some of the addresses adr in the intervals between the recovery points. For the addresses adr into which nothing was written in the interval elapsed, the pointer bit OLD(adr) correctly addresses the data item belonging in each case to the "old" state in the current interval after inversion of control bit A if the two check bits BIT1(adr) and BIT2(adr) correspond at least at the end of the interval elapsed.

Figure 2:
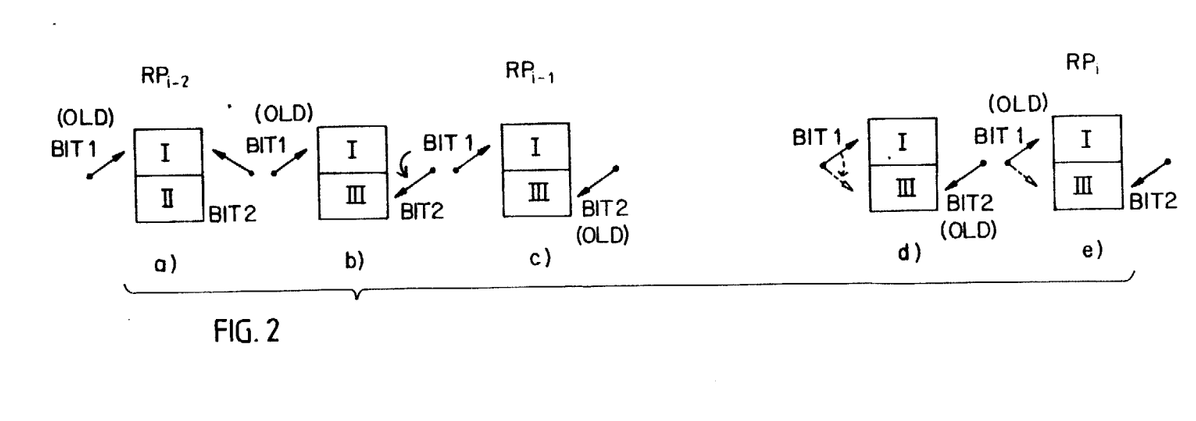
FIG. 2 is a diagrammatic representation for explaining the bit operations, of FIG. 1.

This problem is illustrated in FIG. 2. At (a) to (e) in FIG. 2 a pair of memory words of the second data memory $M_2$ is diagrammatically shown which is in each case intended to be the same pair of memory words. On both sides of the pair of memory words, the logic states of the check bits BIT1(adr) and BIT2(adr) belonging to this pair are shown in each case as arrows pointing to one or the other memory word. FIG. 2(a) shows, for example, the data state of the memory words at a recovery point $RP_{i-2}$. The upper one of the two memory words contains data item I while the lower memory word contains data item II. Both check bits BIT1(adr) and BIT2(adr) "point" to the upper memory word having data item I which is intended to correspond to the data item contained in the corresponding memory word of the first data memory $M_1$ at recovery point $RP_{i-2}$. Data item II is intended to be an older data item which is no longer current. Up to recovery point $RP_{i-1}$, the pointer bit OLD(adr) is to be derived from check bit BIT1(adr). Before this recovery point $RP_{i-1}$ is reached, a new data item III is then to be stored in the pair of memory words shown. To retain the more current "old" data item I, it must be written into the lower memory word. As has already been explained, this is automatically achieved due to the fact that the pointer bit NEW(adr), which has a logic state which is the inverse of the pointer bit OLD(adr) and thus, in this case, of check bit BIT1(adr), is selected as the additional address bit $Z_2$ for the second data memory $M_2$ at the multiplexor $M_X$. When the BIT1(adr) and BIT2(adr) check bits are newly determined, from the pointer bits OLD(adr) and NEW(adr) and from the control bit A after the new data item III has been written into this lower memory word of the pair of memory words shown, the BIT2(adr) check bit is inverted. It now "points" to the lower memory word containing the new data item III after having been written back into the check bit memory $M_C$. Check bit BIT1(adr) remains unchanged. This is shown in FIG. 2(b). At recovery point $RP_{i-1}$, check bit BIT2(adr) is given the meaning of the OLD(adr) pointer bit as shown in FIG. 2(i c). The new "old" data item is now data item III in the lower memory word. In the interval between recovery points $RP_{i-1}$ and $RP_i$, no further new data item is to be written into the pair of memory words shown. However, after check bit BIT1(adr) has retrieved its meaning as OLD(adr) pointer bit, this bit would now point to the wrong "old" data item I in the upper memory word at recovery point $RP_i$. This is because the more current, new "old" data item III is now contained in the lower memory word. This is shown in FIG. 2(e). However, this problem can be solved in a simple manner by setting the check bit which happens not to correspond to the OLD(adr) pointer bit, in this case the BIT1(adr) check bit, to be equal to the check bit corresponding to the OLD(adr) pointer bit, in this case to the BIT2(adr) check bit at some time in the interval between recovery points $RP_{i-1}$ and $RP_i$ as shown in dashes in FIG. 2(d). Naturally, this setting to equality must take place for all addresses adr which were not the subject of a write access in the preceding interval. In addition, the setting to equality must be terminated for all addresses before the next recovery point is reached.

This equating operation is carried out in the control logic $CL_2$ by all addresses adr which are received by the check memory $M_C$ via the address bus $AB_{2.1}$ having been successively generated by the address generator G. As in the case of the addressing by addresses adr which are output to the address bus $AB_{2.1}$ by the receive unit $R_2$, the triplet of check bits addressed in each case is read out of the check bit memory $M_C$ and supplied to the first logic $L_1$ via the check bit bus $CB_1$. This logic forms the pointer bit OLD(adr) from the check bits BIT1(adr) and BIT2(adr) in the manner already described. However, the NEW(adr) pointer bit is now formed in accordance with the rule NEW(adr):=OLD(adr), that is to say with the same logic state as the OLD(adr) pointer bit. The BIT1(adr) and BIT2(adr) check bits (or one of the two) are again newly determined in the manner already specified and written back into the check bit memory $M_C$. There is no operation of writing into the second data memory $M_2$ during this process. This is therefore an operation which runs purely within the control logic $CL_2$. According to the above discussion, the first logic $L_1$ must be capable of executing two different operations with respect to forming the pointer bit NEW(adr). Control line B is used for informing the first logic $L_1$ which of the two operations it is to execute. Whenever the receive unit $R_2$ contains no data for saving in the second data memory $M_2$, which is recognized by the second logic $L_2$, for example, by the signal level on signal line $SREQ_2$, this logic adjusts the logic state of control line B in such a manner that the equating operation last described is executed by the first logic $L_1$. At the same time, the second logic $L_2$ enables, via control lines D, the address generation at address generator G and the connection of the tristate driver $T_{2.3}$ to the address bus $A_{2.1}$. Simultaneously, it decouples the receive unit $R_2$ by means of the two tristate drivers $T_{2.1}$ and $T_{2.2}$ from address bus $AB_{2.1}$ and from data bus $DB_{2.1}$ via control lines $E_2$. As soon as new data are available again in the receive unit $R_2$ for saving in the second data memory $M_2$, execution of the equating operations is interrupted by the second logic $L_2$ and the new data are written into the second data memory $M_2$.

Figure 3:
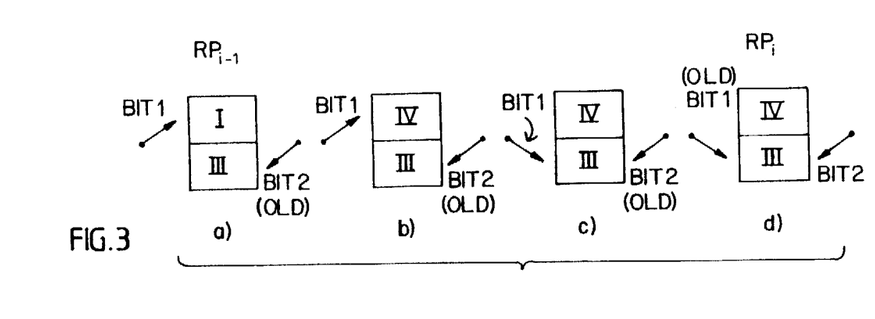
FIG. 3 is a diagrammatic representation, corresponding to FIG. 2, for explaining further bit operations.

The two different operations can therefore alternately occur within the intervals between the recovery points. However, this results in a data consistency problem which will be explained with the aid of FIG. 3. The representation in FIG. 3 corresponds to FIG. 2. In particular, FIG. 3 (a) corresponds to FIG. 2(b). In FIG. 3(c) a write process is additionally assumed between recovery points $RP_{i-1}$ and $RP_i$, the data item IV being written as "new" data item into the upper memory word. During this process, as in FIG. 2 (b), the check bit which does not happen to have the meaning of the OLD(adr) pointer bit, that is to say now the check bit BIT1(adr) is inverted so that it "points" to the memory word with the new data item IV. If then the equating operation, shown in dashes in FIG. 2 (e) were to be subsequently carried out for the pair of memory words shown, the check bit BIT1(adr), which again takes over the meaning of the OLD(adr) pointer bit, would "point" to the memory word with the old "old" data item IV and not to the memory word with the now more current new "old" data item IV at the subsequent recovery point $RP_i$. It is important therefore to prevent the equating operations from being carried out for addresses of pairs of memory words into which a new data item has already been written in the current interval.

This can be achieved in a simple manner by causing the control logic $CL_2$ to remember into which addresses new data have already been written in the current interval. Check bit BIT3(adr) in the check bit memory $M_C$ is used for storing this information. The first logic $L_1$ forms from the check bit BIT3(adr) and from the control bit A an initialization bit INI(adr) in accordance with the rule $$INI(adr) := BIT3(adr).\overline{A} + \overline{BIT3(adr)}.A$$

During each operation in which the data to be saved are written into the second data memory $M_2$, which is called the data save operation in the text which follows, the initialization bit INI(adr) is set to a first logic state, for example to "1" by the first logic $L_1$. Together with the new determination of the BIT1(adr) and BIT2(adr) check bit described, the check bit BIT3(adr) is formed from the initialization bit INI(adr) and from the control bit A in accordance with the rule $$BIT3(adr) := IN(adr).\overline{A} + \overline{INI(adr)}.A$$

and written back, together with the former bits, into the check bit memory $M_C$ via the check bit bus $CB_2$.

Before the beginning of program execution of the first processor, the check bits BIT1(adr), BIT2(adr) and BIT3(adr) and the control bit A must be set in such a manner that no pair of memory words is wrongly considered as being already initialized. For this reason, the following combinations must not occur:

| BIT1 | BIT2 | BIT3 | A |
|------|------|------|---|
| 0 | 1 | 0 | 1 |
| 0 | 1 | 1 | 0 |
| 1 | 0 | 0 | 1 |
| 1 | 0 | 1 | 0 |

During each execution of an equating operation by the first logic $L_1$, the initialization bit INI(adr) is formed by the logic $L_1$ in accordance with the rule specified above and is checked for its logic state. If, with an address adr, the logic state of the initialization bit INI(adr) corresponds to the said first logic state, that is to say for example "1", the equating operation is not carried out by the first logic $L_1$ for the address adr concerned since this address must already have been the subject of a write operation in the current interval.

For all addresses adr for which this is not the case, that is to say for which the equating operation is performed, the initialization bit INI(adr) is set to the first logic state by the first logic $L_1$ after the equating operation has been executed, then the check bit BIT3 (adr) is newly determined and written into the check bit memory. This ensures that, at the next recovery point, all check bits BIT3(adr) have the same logic state and the initialization bit INI(adr), formed in accordance with the rule specified above, has in each case the logic state which is the inverse of the first logic state, that is to say for example "0", after inversion of the control bit A.

Thus far, all essential operations required for creating the save copies in the second data memory $M_2$ have been described.

, If then the second processor, after a fault of the first processor, wants to access a data item belonging to the save copy of the data state of the first data memory $M_1$ at the last recovery point reached by the first processor in the second data memory $M_2$, it simply does this by applying the address adr of this data item to its address bus $AB_2$. The decoder $D_2$ connected to the address bus $AB_2$ subsequently generates the memory request signal $MR_2$ which signals to the second logic $L_2$ in the control logic $CL_2$ that the second processor intends to access the second data memory $M_2$. This logic then decouples the receive unit $R_2$ and the address generator G from the buses $AB_{2.1}$ and $DB_{2.1}$ by appropriately controlling the tristate drivers $T_{2.1}$, $T_{2.2}$ and $T_{2.3}$ via the control line $E_2$ and D and connects them to the buses $AB_2$ and $DB_2$ by appropriately controlling the tristate drivers $T_{2.4}$ and $T_{2.5}$ via control lines $F_2$. Via the read/write control line $RW_2$, the second processor informs the logic $L_2$, which, via the read/write control line $RW_{2.1}$ informs the second data memory $M_2$ that data are to be read from it.

Naturally, the addresses adr for the second data memory $M_2$ output by the second processor are also incomplete. These addresses adr, too, need to be supplemented by the additional address bit $Z_2$. This is formed by the control logic $CL_2$ by using the check bits stored in the check bit memory $M_C$ and the control bits A, in the same manner as described above, only that in this case the OLD(adr) pointer bit is selected at the multiplexor $M_X$ via the control line C and is connected therethrough.

Since no further recovery point clock signal, inverting the logic state of the control signal A, is generated after execution has been taken over by the second processor, the logic state of the control signal A remains unchanged. As a result, the OLD(adr) pointer bit is always derived from the same set of check bits BIT1-(adr) or BIT2(adr) and it is unimportant during which of the two possible operations it is formed in the first logic $L_1$.

The second processor is capable of directly accessing the saved data in the second data memory $M_2$ in the described manner after a failure of the first processor.

According to a preferred embodiment of the invention, the second data memory $M_2$ is used not only as save memory but, at the same time, also as main memory by the second processor. For this purpose, two memory areas having different addresses, a save memory area and a main memory area, must be provided in the second data memory $M_2$. By accessing the main memory area of the second data memory $M_2$, the second processor is capable of executing its own tasks as long as the first processor is operating without faults.

Like the save memory area, the main memory area in the second data memory $M_2$ preferably also has pairs of memory words at all addresses adr belonging to this area, for reasons to be explained below. For the second processor to access the main memory area of the second data memory $M_2$, however, support by the control logic $CL_2$ is then also required. The main memory area is preferably accessed in the same manner as the save memory area is accessed as already described.

So that the control logic $CL_2$ can in each case also generate the additional address bit $Z_2$ for the main memory area in the second data memory $M_2$, the check bits BIT1(adr), BIT2(adr) and BIT3(adr) must also be provided in its check bit memory $M_C$ for all addresses adr of the main memory area. If the logic state of the control line B is set by the second logic $L_2$ during an access to the main memory area in the second data memory $M_2$ in such a manner that the equating operation is in each case executed by the first logic $L_1$, the continuous inverting action of the control bit A does not produce any problems as long as the program provided with the recovery points is run by the first processor. This is because, if the logic states of the BIT1(adr) and BIT2-(adr) check bits correspond to each other, the same memory word in the pairs of memory words of the second data memory $M_2$ is always addressed, by the additional address bit $Z_2$ formed from them via the pointer bit OLD(adr), independently of the logic state of the control bit A.

Due to the bidirectional, design of the tristate driver $T_{2.5}$ data can both be written and read as is required with main memory operation. The second processor informs the second logic $L_2$ via read/write control line $RW_2$ whether it is to be a read or a write operation.

In this embodiment of the invention, the save memory area of the second data memory $M_2$, after a failure of the first processor and after the second processor has taken over program execution, can be used directly as new main memory area by the second processor. This obviates a time-consuming copying of the saved data.

The system consisting of first processor and first data memory $M_1$ is preferably arranged to be spatially and electrically separated from the system consisting of second processor, second data memory $M_2$ and control logic $CL_2$. To separate the two systems electrically, the data link $DL_1$ is preferably constructed as serial optical data channel. By this means it can be ensured that a fault in the first-mentioned of the two systems, for example a short circuit or a power failure, does not have any influence on the operational capability of the second-mentioned system. The requirements for the band width of the data link $DL_1$ can be considerably reduced by temporarily storing the data to be transferred via the data link $DL_1$ in the buffer memory $B_1$ of the transmit unit $S_1$ and transmitting the data with a relatively uniform rate.

As explained in detail above, the control logic $CL_2$ must perform the equating operation, or at least check that its performance is required, in each interval between two recovery points for all addresses adr of at least the save memory area of the second data memory $M_2$ for reasons of data consistency. This can be done simultaneously with greater time efficiency by executing the equating operations in parallel for several addresses adr.

Figure 4:
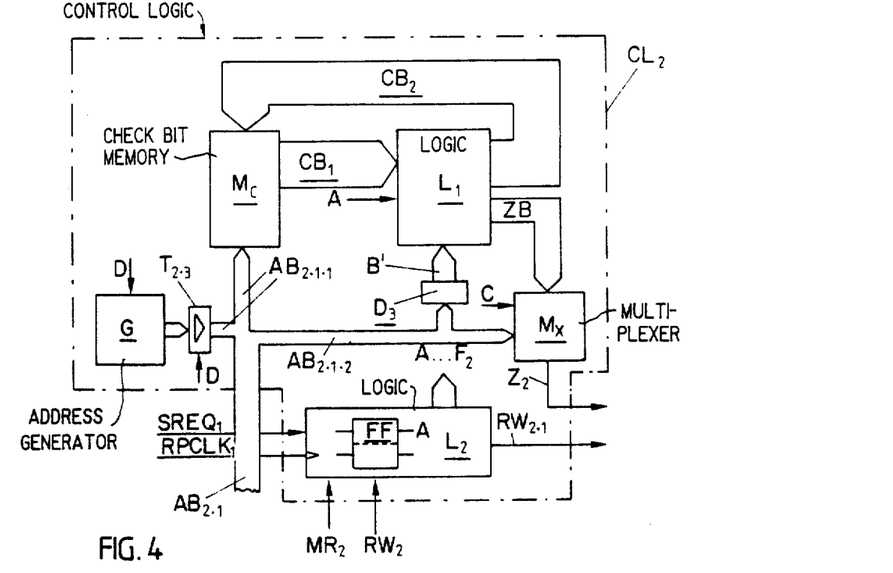
FIG. 4 is a block diagram of a second embodiment of the control logic in which the bit operations are executed partially in parallel.

FIG. 4 shows an embodiment of the control logic $CL_2$ which does this. The control logic of FIG. 4 essentially has the same configuration as the control logic of FIG. 1. In particular, all lines and buses leading into it and leading out of it correspond to one another so that it could directly replace the control logic shown in FIG. 1. Corresponding to the parallel processing of, for example, in each case m of the, for example, total of n addresses adr, the check bit buses $CB_1$ and $CB_2$ have been extended to m×3 bits in the control logic of FIG. 4. Group addresses formed from a subset of all address bits of the address bits forming the addresses adr are now used for addressing the check bit memory $M_C$. Correspondingly, only a part of the address lines of the address bus $AB_{2.1}$, forming an address bus $AB_{2.1.1}$, are connected to the check bit memory $M_C$. The address generator G now also only needs to generate the group addresses and accordingly is therefore connected to the address bus $AB_{2.1.1}$. The first logic $L_1$ now has m similar circuits for processing m check bit triplets. Instead of the only two control lines OLD and NEW in the control logic according to FIG. 1, the m OLD and m NEW control lines lead from the first logic $L_1$ to the multiplexor $M_X$ which form the pointer bit bus ZB in the control logic according to FIG. 4.

Since it must still be possible to perform the data save operation and the accesses to the second data memory $M_2$ by the second processor for individual addresses adr, the address lines of the address bus $AB_{2.1}$, forming an address bus $AB_{2.1.2}$ and not needed for forming the group address are connected to the multiplexor $M_X$ and to a decoder $D_3$. From these address lines, the decoder $D_3$ forms m control lines B' for the first logic $L_1$ by means of which it recognizes which of its m parallel circuits is to carry out the data save operation. At the same time, the equating operation can be performed by all other circuits, excepting however those in which a data save operation has already been carried out in the current interval. In the multiplexor $M_X$, one of the m OLD or m NEW control lines is selected via the said address lines of the address bus $AB_{2.1.2}$.

The control logic $CL_2$ can also be constructed for performing the equating operations completely in parallel instead of performing the equation operations only partially in parallel for m addresses adr.

Figure 5:
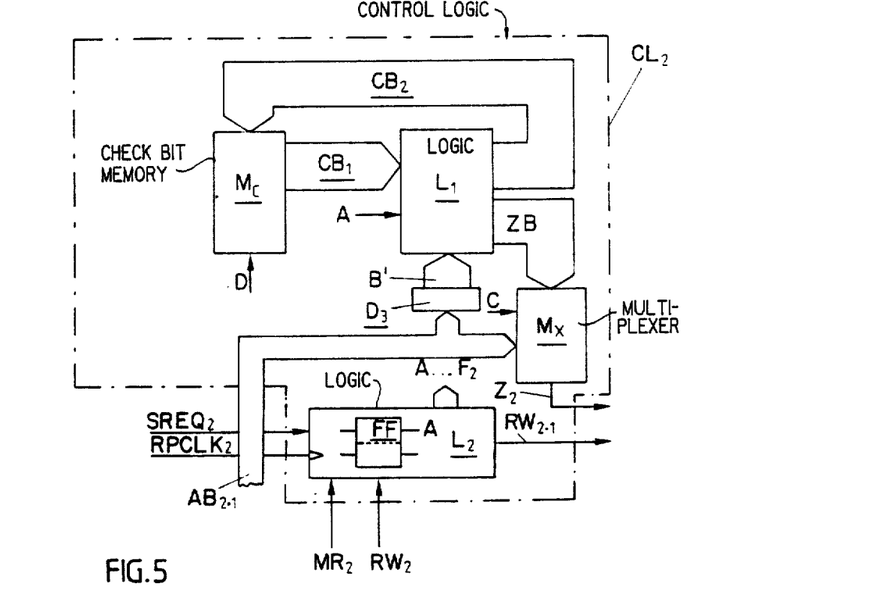
FIG. 5 is a block diagram of a third embodiment of the control logic in which the bit operations are executed completely in parallel and FIG. 6 is a block diagram of a fault-tolerant multiprocessor arrangement according to the invention, comprising two systems of processor, data memory and control logic which save one another's data.

FIG. 5 shows an embodiment of the control logic $CL_2$ by means of which such a completely parallel execution of all equating operations is possible.

The configuration of the control logic $CL_2$ of FIG. 5 essentially corresponds to the control logic $CL_2$ of FIG. 4, particularly also with respect to the lines and buses leading into it and leading out of it. It could also replace the control logic $CL_2$ in FIG. 1. However, the control logic shown in FIG. 5 no longer has an address generator G because it is superfluous if the equating operations are carried out completely in parallel for all addresses adr. In addition, the check bit memory $M_C$ is no longer connected to the address bus $AB_{2.1}$. Only a single control line is still connected to it, for example the control line D which has now become free and which was needed for controlling the address generator G in the control logics of FIG. 1 and FIG. 4. Following an appropriate signal on this control line D, all check bits contained in check bit memory $M_C$ are transferred in parallel to the first logic $L_1$. This logic has a number of parallel circuits which corresponds to the total number n of possible addresses adr. Compared with the corresponding buses in the control logic of FIG. 1, the check bit buses $CB_1$ and $CB_2$ and the pointer bit bus $Z_B$ are extended by n times. The multiplexor $M_X$ and the decoder $D_3$ are supplied with all address lines of the address bus $AB_{2,1}$. From these address lines, the decoder $D_3$ forms n control lines B' for the first logic $L_1$. In turn, the logic state of these n control lines B' indicates to the first logic $L_1$ for which of the n addresses adr the data save operation has to be carried out. In the multiplexor $M_X$, one of the now n OLD or n NEW control lines is again selected via the said address lines.

Using the control logic shown in FIG. 5, all required equating operations can be executed in a single step, that is to say extremely rapidly. In particular, this can be done immediately after each recovery point has been reached and before the first required data save operation is executed. This method of proceeding has the special advantage that, as a result, the third check bit BIT3(adr) can be omitted. This is because the latter, as explained, was needed in the control logics of FIG. 1 and FIG. 4 only to prevent equating operations from being executed for addresses adr which had already been accessed for data saving in the respective current interval. However, care must be taken with this method to ensure that during a data save operation the equating operation is not performed again for the parallel addresses not affected by the data save operation. The check bit memory $M_C$ in the control logic of FIG. 5 therefore needs to be designed only for receiving check bits BIT1(adr) and BIT2(adr). Correspondingly, the circuit expenditure within the first logic $L_1$ is simplified since there is no longer any need to form and process an initialization bit INI(adr). The check bit buses $CB_1$ and $CB_2$ only need to have a width of n x two bits in the control logic of FIG. 4.

A particularly elegant solution is obtained by integrating the control logic $CL_2$ shown in FIG. 5 in a VLSI (very-large-scale integration) chip. This measure results in a further increase in the operating speed of the control logic $CL_2$. The expenditure for the decoder $D_3$ and multiplexor $M_X$ is reduced by arranging n elements from two storage cells each for BIT1 and BIT2 and from the logic $L_1$ in the form of a matrix.

The previous discussion only assumed that the second processor takes over the operation of the first processor in the event of a failure of this processor. Conversely, however, according to an advantageous development of the invention, the first processor can also be constructed for saving the data of the second processor so that the two systems save each other's data. Such an extended fault-tolerant multiprocessor arrangement is shown in FIG. 6.

It has a completely symmetrical configuration. The lower part of FIG. 6 completely corresponds to the lower part of FIG. 1, even with regard to the reference symbols. The only difference is that the configuration of the control logic $CL_2$ has not been shown in detail here. The control logics $CL_2$ shown in FIGS. 4 and 5 could also be used here. The upper part of FIG. 6 is a mirror image of the lower part. However, all reference symbols are here given the index 1 for better differentiation.

Figure 6:
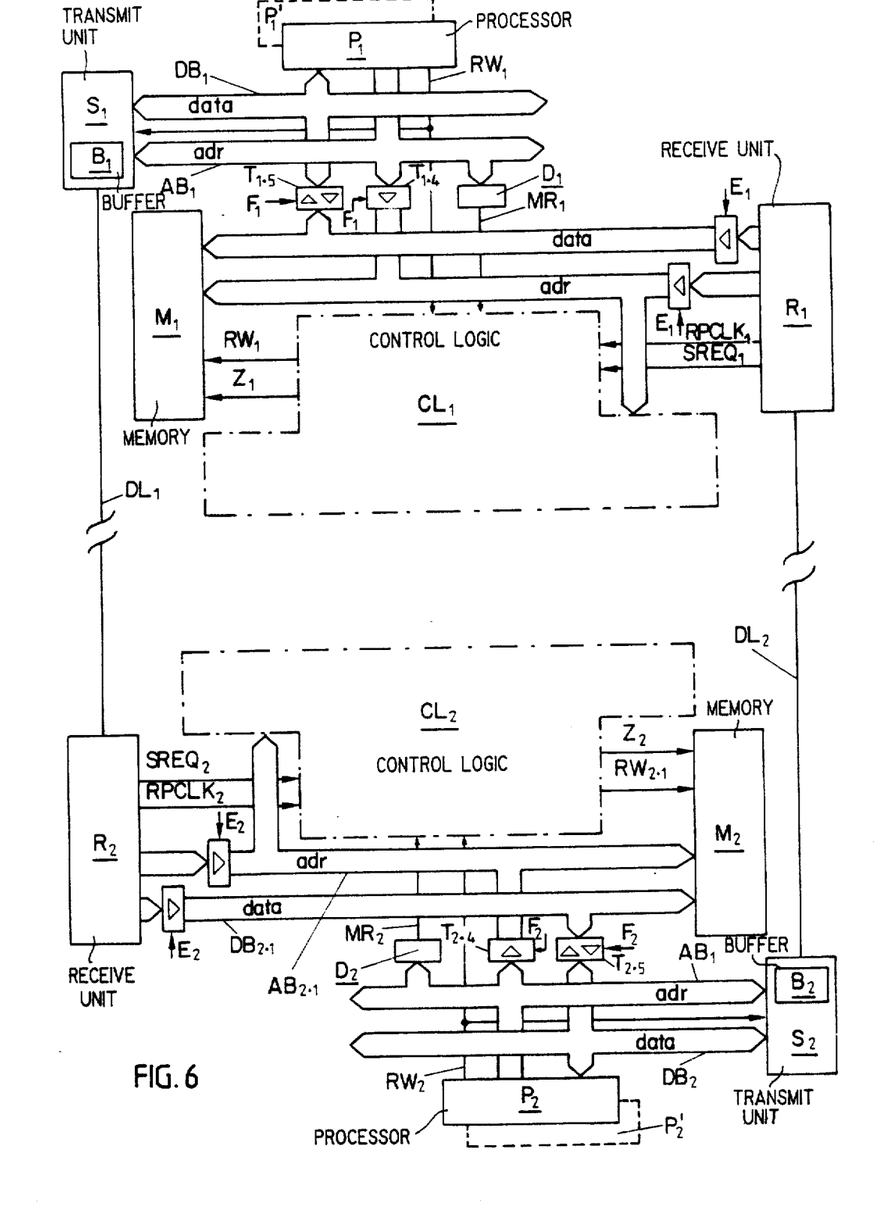

If one of the two processors of FIG. 6 fails, the respective other one takes over its task. When doing so, it accesses the saved data contained in the save memory area of its associated data memory and subsequently continues to use the save memory area as the new main memory area. After the failed processor has been restored in the symmetrical multiprocessor system of FIG. 6, it can be given the task of safeguarding the other processor which did not fail. In this arrangement, the identical configuration of the save memory and main memory areas in the data memories $M_1$, $M_2$ with pairs of memory words in each case now also finds advantageous application. This is because, as a result, the memory area of the failed processor originally used as main memory area by the other processor which did not fail can be made available as new save memory area after having been restored. It is not necessary to interrupt the program run when bringing the failed processor back on line.

After reintegration of the failed processor in the manner described, the old status has been restored when the program originally executed by the first processor is now processed by the second processor and the program originally processed by the second processor is now executed by the first processor. The main memory and save memory areas in data memories $M_1$ and $M_2$ are also interchanged.

Naturally, the fault-tolerant multiprocessor arrangement shown in FIG. 6, comprising two systems which safeguard each other, can also be extended to three or even more systems which, for example, safeguard each other in pairs.

Obviously, numerous modifications and variations of the present invention are possible in light of the above teachings. It is therefore to be understood that within the scope of the appended claims, the invention may be practiced otherwise than as specifically described herein.

I claim:

1. In a fault-tolerant multiprocessor arrangement comprising at least a first and a second processor, a first data memory for storing memory words, each of which being stored under an address different from the address of another of said memory words, a second data memory for storing a pair of memory words under each of said addresses, and a control logic with at least a check bit memory having for each pair of memory words stored under the same address in said second data memory at least two check bits for completing the address of each pair of memory words and a one-bit storage cell containing a control bit, an operating method comprising the steps of:

said first processing during execution of a program containing recovery points writes a first of said memory words under a first of said addresses into said first data memory, transfers said memory word including said first address from said first to said second data memory, and writes said transferred first memory word and its respective address into said second data memory under control of said control logic, said first processor during execution of said program further transfers a recovery point signal indicating in each case the arrival of said program at a recovery point, thereby causing the control logic to invert said control bit of said one-bit storage cell at each recovery point in response to said transferred recovery signal, said control logic during the process of writing of said first memory word into said second data memory reads out of said check bit memory a first and a second check bit discriminated by said first address, forms a first pointer bit from said first, said second and said control bit in accordance with the rule:

$OLD(1):=BIT1(1).\bar{A}+BIT2(1).A$ and a second pointer bit having a binary state which is the inverse of said first pointer bit, feeds said second pointer bit to an address input of said second data memory to complete the pair address for said first address of said first memory word of said second data memory, first newly determines the binary states of said and second control bits in accordance with the rules:

$BIT1(1):=NEW(1).A+OLD(1).\bar{A}$, and
$BIT2(1):=NEW(1).\bar{A}+OLD(1).A$, writes said newly determined first and second bits into said check bit memory, said control logic in said interval between said two current recovery points further reads out of said check bit memory a third and a fourth check bit discriminated by a second address of a pair of secondary memory words into which not data have yet been entered within said interval, forms a third and a fourth pointer bit from said third and said fourth check and said control bit in accordance with the rules:

$OLD(2):=BIT1(2).A+BIT2(2).\bar{A}$, and
$NEW(2):=BIT1(2).\bar{A}+BIT2(2).A$ newly determines the binary states of said third and said fourth check bit from said third and said fourth pointer and said control bit in accordance with the rules:

$BIT1(2):=NEW(2).A+OLD(2).\bar{A}$, and
$BIT2(2):=NEW(2).\bar{A}+OLD(2).A$, and writes said newly determined third and fourth check bit into said check bit memory, said second processor in response to a fault signal of said first processor takes over and continues the execution of said program at a recovery point last reached by said first processor during execution of said program by use of the data states at this recovery point transferred into said second data memory, said control logic during the process of each reading of said second processor from said second data memory forms in the case of said first or said second address said first or said third pointer bit, and feeds said formed first or third pointer bit to said address input of said second data memory for completing the pair addresses for said first or second address of said first or second memory word of said second data memory, wherein A means said control bit, BIT(1), BIT2(1), BIT1(2) and BIT2(2) mean said first, second, third and fourth check bit, OLD(1), NEW(1), OLD(2) and NEW(2) mean said first, second, third and fourth pointer bit, the dot means a logical AND operation, the plus sign means a logical OR operation, and the bar above the symbols means negation.

2. A method according to claim 1 wherein said control logic contains an address generator, said method further comprising the steps of:

said control logic executes forming of pair addresses in a loop through all addresses, and said address generator successively generates all addresses.

3. A method according to claim 1 wherein said control logic contains an address generator, said method further comprising the steps of:

said control logic executes forming of pair addresses in a loop through groups of addresses having in each case a common group address, and said address generator successively generates said group addresses.

4. A method according to claim 2 or 3 wherein said check bit memory has for each first resp. second address in addition to said first and second resp. third and fourth check bit a fifth resp. a sixth check bit, said method further comprising the steps of:

said control logic reads said fifth resp. sixth check bit in each case together with said first and second resp. third or fourth check bit from said check bit memory, after processing and if necessary changing, writes back said fifth resp. sixth check bit together with said first and second rsp. third and fourth check bit into said check bit memory, forms a first resp. a second initialization bit from said fifth resp. said sixth check and said control bit in accordance with the rules:

$INI(1):BIT3(1).\bar{A}+\overline{BIT3(1)}.A$, and
$INI(2):=BIT3(2).\bar{A}+\overline{BIT3(2)}.A$, sets said first initialization bit with each execution of writing into said second data memory to a first binary state, for example to "1", newly determines the binary state of said fifth check bit in accordance with the rule $BIT3(1):=INI(1).A+INI(1).\bar{A}+\overline{INI(1)}.A$, writes said newly determined fifth check bit into said check bit memory, uses said first initialization bit with each execution of reading from said second data memory in a loop for recognizing addresses of pairs of memory values into which data have already been written in the respective current interval, sets said second initialization bit with each forming of address pairs in a loop to a first binary state, newly determines the binary state of said sixth check bit as described, and writes the newly determined sixth check bit into the check bit memory, wherein BIT3(1) resp. BIT3(2) means said fifth resp. sixth check bit, and INI(1) and INI(2) means said first and said second initialization bit.

5. A method claim according to claim 1, in which:

the control logic executes the forming of pair addresses in parallel for all addresses immediately after arrival at each recovery point, and only afterwords writes into said second data memory.

6. A method as claimed in claim 1, wherein said second data memory has two memory areas having in each case pairs of memory words, in which one of the memory areas in used as a save memory area for saving the data state of said first data memory at the recovery points and the other memory area is used as main memory area by said second processor, said method further comprising the steps of:

said control unit in each case supplies a point bit, which does not change in time, to the said address input of said second data memory for completing the pair of address for the memory word address during all memory accesses to the main memory areas.

* * * * *